Patented Apr. 10, 1945

2,373,401

UNITED STATES PATENT OFFICE 2,373,401

INSULATING MATERIAL AND METHOD OF MAKING THE SAME

Ellis Gray King, Pittsburgh, Pa., assignor to Armstrong Cork Company, Lancaster, Pa., a corporation of Pennsylvania No Drawing. Application May 31, 1941, Serial No. 396,173

18 Claims. (Cl. 260—6)

This invention relates to sound absorbing bodies.

It has heretofore been proposed to use foamed urea-formaldehyde resins for such purposes. However, as stated in United States Patent 2,076,295, the bodies produced from such resins have small cells which are entirely closed in themselves. To obtain the most effective sound absorption, it is desirable to provide such bodies with innumerable intercommunicating cells or channels having highly irregular surfaces.

Attempts to accomplish this desideratum, and to simultaneously compensate for any decrease in strength resulting ordinarily from the elimination of a substantial proportion of the supporting material surrounding the closed cells to establish an intercommunicating cellular network, by incorporating a predominant proportion of fibrous substances into water-soluble resins of the urea-aldehyde or phenol-aldehyde class in the foamed condition produce non-uniform foam-like bodies in which the binder has largely migrated to the surface leaving the center soft and friable. Furthermore, the resin binder has poor adhesiveness with respect to the fibers and the bodies are generally structurally weak and brittle.

Attempts to employ a mixture of casein or similar protein and a water-soluble urea-aldehyde or water-soluble phenol-aldehyde resin for binding such fibers encounter serious difficulties since stiff gels which cannot be foamed are produced immediately upon the addition of the partially reacted resin to the casein. When the concentration of casein is reduced to a point where stiff gels are not produced, the foams are not stable so that drainage and considerable shrinkage results from their use in forming molded bodies. Also, in such cases, the bodies are generally excessively light and weak.

However, in spite of these difficulties, I have found that a binder comprising a mixture of a water-soluble urea-aldehyde or water-soluble phenol-aldehyde resin and a water-insoluble protein, such as casein, soya bean protein, and cottonseed protein, which can be dispersed in water by a volatile dispersing agent, can be converted by suitable processing into a stable foam which sets with a concomitant evaporation of the dispersing agent to form a strong binding medium for the fibrous substances.

In my compositions, the protein is insolubilized or hardened by reaction of the aldehyde liberated by the water-soluble urea-aldehyde or water-soluble phenol-aldehyde resin as the resin sets. To prevent the immediate gelation of the mixture obtained upon the addition of the resin to the protein, I may employ a resin substantially free of uncombined aldehyde or I may add ammonium hydroxide to the resin to combine with the free aldehyde prior to the mixing of the resin with the protein. However, I have found that it is not necessary to prevent such gelation, since the gelled mixture of protein and resin unexpectedly becomes liquefied to a foamable condition after standing at ordinary temperatures.

Sound absorbing bodies made in accordance with this invention comprise a non-absorbent fibrous material forming the essential structure and binder forming from about 7% to 35% by weight of the body. The binder is in the foamed condition so that it effectively binds the fibers into a strong skeletal structure, and it is itself free of any large, dense agglomerations. The fibrous material and the foamed binder cooperate to produce a relatively strong material which at the same time has intercommunicating and interlaced cells or channels of such irregular shape and size that the material is a very effective sound absorber. The intercommunicating cells have wall surfaces of highly irregular character as compared to the cells in foamed urea-formaldehyde resin materials heretofore produced.

For the fibrous material, any organic or inorganic non-absorbent fibrous material is suitable. Any of the mineral wools, such as slag wool, mineral wool per se, and glass wool, are particularly satisfactory. Not only are these mineral wools fireproof, but they also have the advantages of being inert to water and relatively unaffected by other corrosive agencies. The fibers, during the foaming, tend to stabilize the foam structure; they also prevent shrinkage during drying, and in the final product, they constitute the main structure of what may be designated as the walls of the cells therein and are largely responsible for the intercommunicating nature of the network constituting the product.

Casein, soya bean protein, or cottonseed protein are representative normally water-insoluble proteins which, in combination with the resin, form an effective, tough, and highly adhesive binder for the fibrous materials. The two components, the protein and the resin, complement each other so that in combination, they form a mixture which can be readily foamed to a stable condition and which can be set readily in the foamed condition to form a water- and mold-resistant composition. The viscous character of the protein-resin mixture prevents migration of the binder from the interior to the exterior surface of the formed blocks. The presence of protein in the binder improves the adhesiveness of the mixture, imparts strength and toughness to the product, prevents the aldehyde odor of the resin from manifesting itself, and is itself insolubilized by the aldehyde liberated by the resin as it sets.

In general, the procedure employed in making the composition consists in forming a dispersion of the protein and water, preferably by the use of ammonium hydroxide at a pH ranging from about 9 to 10, and letting the dispersion stand, if necessary, until it becomes quite fluid. In the case of soya bean protein, hydrochloric acid may be substituted for ammonia as the dispersing agent and has the additional advantage that the acid accelerates the setting of the resin. The use of a volatile material, such as ammonia or hydrochloric acid, permits of vaporization to leave the protein in the form of an insoluble mass. To the fluid protein dispersion, there is added an aqueous dispersion of a partially condensed resin which is still water-soluble. If the mixture is a gel, it is again allowed to stand until it becomes fluid. When a fluid condition is reached, the mixture is beaten to a foamed condition, with or without the addition of a foaming agent therein. During the foaming, the fibrous substance are beaten in. The foamed mass is transferred to a mold, and is therein permitted to dry, preferably at an elevated temperature.

While I do not wish to be limited to any particular theory of operation, I present the following description of the mechanisms or phenomena through which it appears that the several components of the composition proceed during manufacture. As the fluid mass comprising the mixture of resin and protein dispersions is beaten into a stiff foam, the tackiness of the foamed binder tends to pull apart the clumps of wool as the mineral wool is incorporated into the foam, thus tending to give a uniform intermeshing of the fibers. The presence of innumerable small bubbles in the foam appears to assist this operation and keep the fibers apart presumably by surface tension and viscosity effects. The intermeshed fibers stabilize the foam by virtue of the fact that they form part of the walls of some of the bubbles and also by virtue of the fact that they inhibit drainage from between the cells, probably because of surface tension effects. Because of the stiffness of the fibers and because of the frictional effects at the points of contact of the innumerable intermeshed fibers, they resist shrinkage in the overall dimensions of any block formed of the wet mass of protein-resin mixture. When drying of the wet shaped mass is performed, the binder itself may shrink, but the tendency of the binder, because of surface tension effects, to cling to the fibers causes the bubble films in the binder to break upon the occurrence of the shrinkage, whereupon the binder is redistributed to the points of contact or proximity of the intermeshed fibers where it is most advantageous for the binder to be in the final product, and there is obtained an intercommunicating structure comprising mainly a skeleton of the fibers joined at their points of intercrossing by the binder. Since the fibers are not oriented in any one direction but lie in all planes, the final insulating block obtained has substantially equal strength in all directions.

The following examples, in which the proportions are given in parts by weight, are illustrative of the invention:

*Example 1*

Sufficient lactic acid casein to give 60 parts of bone-dry casein was added to sufficient water to make the total water content 400 parts. After permitting the mass to swell for ten minutes, 12 parts of concentrated ammonium hydroxide were added to the casein and the rapidly thickening liquid was allowed to stand an additional fifteen minutes. Thereupon, the batch was heated for one hour in a water bath at 64° C. After the mass was cooled, 85.7 parts of an aqueous dispersion of water-soluble urea-formaldehyde resin of 70% concentration were added. The solution gelled almost immediately and was allowed to stand five hours at room temperature. That part of this composition which was not used immediately as directed hereinbelow was stored for a considerable period of time at temperatures in the neighborhood at 0° C. without becoming too thick for satisfactory use subsequently in the process of this invention.

To 383.5 parts of the casein-resin dispersion, there were added 110 parts of water containing 2.7 parts of the sodium salt of isopropyl naphthalene sulfonate, and the mixture was aerated to a voluminous foam having a specific gravity of 0.192. During this aeration, 330 parts of loose, opened mineral wool were added. The aerated, wet mixture containing the mineral wool had a final specific gravity of 0.447 and yielded, after molding and drying, a block weighing 14.8 pounds per cubic foot. The drying of the molded block was performed at 65° C. in an atmosphere having a slight humidity, and a final induration was performed by heating the block for several hours at 100° C. in a drying oven.

*Example 2*

Soya bean protein (7.5 parts) was suspended in 50 parts of water, and concentrated ammonium hydroxide was added to give a pH of 9.7. The mixture formed a gel which thinned upon standing. After thinning, 10.7 parts of an aqueous dispersion of water-soluble urea-formaldehyde resin of 70% concentration were added, such addition thickening the protein solution. Saponin (0.3 part) was dissolved in this preparation which was then foamed, and 50 parts mineral wool were beaten into it to produce a final wet mixture having a specific gravity of 0.476. The mixture was transferred to molds and thereupon dried. The final blocks had a density of 14.4 pounds per cubic foot.

*Example 3*

To 16.7 parts of the casein-resin dispersion of Example 1, 16.7 parts of gypsum and 66.6 parts of mineral wool were added and the mixture was aerated to a foam. The molded and dried block had a density of 12.3 pounds per cubic foot and a modulus of rupture of 47.5 pounds per square inch. The gypsum imparted a white color to the block which would otherwise have had a light gray color.

*Example 4*

Sixty parts of acid casein were soaked in 450 parts of water containing 12 parts of concentrated ammonium hydroxide and the mass was heated to obtain a uniform dispersion of the casein. Four parts of concentrated ammonia were added to 45 parts of an aqueous dispersion of a water soluble urea-formaldehyde resin of 70% concentration to combine with all of the free formaldehyde in the resin dispersion. The casein and resin dispersions were mixed, and since no gelation occurred, the mixture was foamed immediately with the incorporation of 360 parts of mineral wool, in accordance with the procedure of Example 1 above.

*Example 5*

The procedure of this example was precisely that employed in Example 1, except for the fact that 458 parts of water were employed instead of 403 parts of water. The specific gravity of the foam before the addition of the mineral wool was 0.173 and after the addition of the mineral wool, the aeration was carried to a point where the specific gravity of the foam was 0.311. The final product had a lighter weight than that of Example 1, being 11.2 pounds per cubic foot.

*Example 6*

In 40 parts of water, 3.75 parts of soya bean protein were dispersed by a small amount of ammonium hydroxide sufficient to impart a final pH of 10 to the dispersion. After the dispersion thinned sufficiently, 16 parts of water-soluble urea-formaldehyde resin (containing only traces of free formaldehyde) of 70% concentration in aqueous dispersion and 0.3 parts of saponin were added. No gelation occurred upon the mixing of the resin and protein dispersions. The mass was aerated and 30 parts of a mineral wool were added during aeration, such aeration being continued to produce a specific gravity of 0.368 in the foamed mass. The foamed mass was then molded and dried. Blocks of the dried material had a density of 12.3 pounds per cubic foot, a modulus of rupture for a 3" bar of 70 pounds per square inch and a crushing strength of 40 pounds per square inch.

*Example 7*

Sixty parts of acid casein were allowed to soak in 400 parts of water. Then 15 parts of concentrated ammonium hydroxide were added to the casein and the mass was heated to obtain a uniform dispersion. The mass was cooled and 90 parts of a water-soluble phenol-formaldehyde resin in the form of an aqueous dispersion of 60% concentration were added. The gel formed upon the mixing of the resin and protein dispersions was allowed to stand until liquefaction occurred. To the liquefied mass, a solution of 4 parts of saponin in 150 parts of water were added. While 500 parts of mineral wool were gradually added to the mass, it was aerated to a foamed condition. The mass was molded and dried.

*Example 8*

Seven parts of soya bean protein were soaked in 49 parts of water and 1.2 parts of concentrated hydrochloric acid were then added. After the dispersion became homogeneous, 69 parts of a 50% dispersion of urea-formaldehyde in water were added together with 0.5 part of saponin in 115 parts of water and the mixture was then aerated. Then 180 parts of mineral wool were incorporated with thorough mixing and aeration to obtain as uniform a foamed mass as possible. The mixture was shaped and dried.

Instead of the foaming agents specifically recited in the examples above, there may also be used such foaming agents as are specifically mentioned in United States Patent 2,076,295, as well as natural foaming agents such as soap bark, liquorice root, and gelatin. Similarly, other coloring and whiting materials such as asbestine may be employed. Such other pigments may include whiting, lithopone, titanium dioxide, and zinc oxide as well as colored pigments and dyes. The addition of lead sulfate and calcium sulfate tends to reduce any hygroscopic tendencies of the final product; however, the hygroscopicity of the products without the addition of such substances is not objectionable.

While the invention has been disclosed in terms of specific examples employing certain materials in definitely stated proportions, the description is intended to be merely illustrative. It is obvious that various modifications may be made without departing from the spirit of the invention and it is to be understood that the invention is limited only by the appended claims.

I claim:

1. An article of manufacture having an intercommunicating structure and comprising the set residue of a foamed mixture of a mineral wool, a water-insoluble protein dispersed in water by means of a volatile dispersing agent, and a water-soluble phenol-aldehyde resin, the total non-fibrous binder material constituting from about 7% to 35% by weight of said article.

2. An article of manufacture having an intercommunicating structure and comprising the set residue of a foamed mixture of a mineral wool, a water-insoluble protein dispersed in water by means of a volatile dispersing agent, and a water-soluble urea-aldehyde resin, the total non-fibrous material constituting from about 7% to 35% by weight of said article.

3. An article of manufacture having an intercommunicating structure and comprising the set residue of a foamed mixture of a mineral wool, a water-insoluble protein dispersed in water by means of a volatile dispersing agent, and a resin selected from the group consisting of water-soluble urea-aldehyde and water-soluble phenol-aldehyde resins, the total non-fibrous material constituting from about 7% to 35% by weight of said article, and said protein being present in a proportion by weight approximately equal to that of said resin.

4. In a method of making insulating masses, the steps of making an aqueous dispersion of a water-insoluble protein by means of a volatile dispersing agent, mixing therein an aqueous dispersion of a resin selected from the group consisting of water-soluble urea-aldehyde and water-soluble phenol-aldehyde resins, incorporating mineral wool therein, aerating the mixture, and then setting said aerated mass, the total non-fibrous binder material constituting from about 7% to 35% by weight of the mass.

5. In a method of making insulating masses, the steps of making an aqueous dispersion of a water-insoluble protein by means of a volatile dispersing agent, mixing therein a water-soluble urea-aldehyde resin, incorporating mineral wool therein while aerating said mixture, and setting said aerated mass by heating it, the total non-fibrous binder material constituting from about 7% to 35% by weight of the mass.

6. In a method of making insulating masses, the steps of making an aqueous dispersion of a water-insoluble protein by means of a volatile dispersing agent, preparing a dispersion, substantially free of uncombined aldehyde, of a resin selected from the group consisting of water-soluble urea-aldehyde and water-soluble phenol-aldehyde resins, mixing said dispersions with mineral wool, aerating the mass, and setting said aerated mass, the total non-fibrous binder material constituting from about 7% to 35% by weight of the mass.

7. In a method of making insulating masses, the steps of making an aqueous dispersion of a water-insoluble protein by means of a volatile dispersing agent, mixing therein a resin selected from the group consisting of water-soluble urea-aldehyde and water-soluble phenol-aldehyde resins, liquefying before processing any gel formed in said preceding steps by permitting said gel to stand, aerating said mixture and incorporating mineral wool therein while continuing said aeration, and setting said aerated mass by heating it, the total non-fibrous binder material constituting from about 7% to 35% by weight of the mass.

8. In a method of making insulating masses, the steps of making an aqueous dispersion of a water-insoluble protein by means of a volatile dispersing agent, mixing therein an aqueous dispersion of a water-soluble phenol-formaldehyde resin, aerating said mixture and incorporating mineral wool therein while continuing said aeration, and setting said aerated mass by heating it, the total non-fibrous binder material constituting from about 7% to 35% by weight of the mass.

9. In a method of making insulating masses, the steps of making an aqueous dispersion of casein by means of ammonia, mixing therein a water-soluble urea-formaldehyde resin, aerating said mixture and incorporating mineral wool fibers therein while continuing said aeration, and setting said aerated mass by heating it, the total non-fibrous binder material constituting from about 7% to 35% by weight of the mass.

10. In a method of making insulating masses, the steps of making an aqueous dispersion of soya bean protein by means of ammonia, mixing therein a water-soluble urea-formaldehyde resin, aerating said mixture and incorporating mineral wool fibers therein while continuing said aeration, and setting said aerated mass by heating it, the total non-fibrous binder material constituting from about 7% to 35% by weight of the mass.

11. An article of manufacture having an intercommunicating structure and comprising the set residue of a foamed mixture comprising mineral wool, and an aqueous dispersion of a water-insoluble protein dispersed in water by means of a volatile dispersing agent and a resin selected from the group consisting of water-soluble urea-aldehyde and water-soluble phenol-aldehyde resins, the total non-fibrous binder material constituting from about 7% to 35% by weight of the article.

12. An article of manufacture having an intercommunicating structure and comprising the set residue of a foamed mixture of a mineral wool, and an aqueous dispersion of casein in combination with a resin selected from the group consisting of water-soluble urea-aldehyde and water-soluble phenol-aldehyde resins, the total non-fibrous binder material constituting from about 7% to 35% by weight of the article.

13. An article of manufacture having an intercommunicating structure and comprising the set residue of a foamed mixture of a mineral wool, and an aqueous dispersion of casein in combination with a water-soluble phenol-formaldehyde resin, the total non-fibrous binder material constituting from about 7% to 35% by weight of the article.

14. An article of manufacture having an intercommunicating structure and comprising the set residue of a foamed mixture of a mineral wool, and an aqueous dispersion of casein in combination with a water-soluble urea-formaldehyde resin, the total non-fibrous binder material constituting from about 7% to 35% by weight of the article.

15. An article of manufacture having an intercommunicating structure and comprising the set residue of a foamed mixture of a mineral wool, and an aqueous dispersion of soya bean protein in combination with a water-soluble urea-formaldehyde resin, the total non-fibrous binder material constituting from about 7% to 35% by weight of the article.

16. An article of manufacture having an intercommunicating structure and comprising the set residue of a foamed mixture of a mineral wool, a water-insoluble protein dispersed in water by means of a volatile dispersing agent, and a resin selected from the group consisting of water-soluble urea-aldehyde and water-soluble phenol-aldehyde resins, said article being opacified by the incorporation therein of a pigment, the total non-fibrous binding material constituting from about 7% to 35% by weight of said article.

17. An article of manufacture having an intercommunicating structure and comprising the set residue of a foamed mixture of a mineral wool, an aqueous dispersion of a soy bean protein dispersed in water by means of a volatile dispersing agent, and a resin selected from the group consisting of water-soluble urea-aldehyde and water-soluble phenol-aldehyde resins, the total non-fibrous binder material constituting from about 7% to 35% by weight of said article.

18. In a method of making an insulating mass having an intercommunicating structure, the steps of making an aqueous dispersion of a soy bean protein by means of a volatile dispersing agent, mixing therein a resin selected from the group consisting of water-soluble urea-aldehyde and water-soluble phenol-aldehyde resins, incorporating mineral wool therein and aerating the mixture, and then setting said aerated mass, the total non-fibrous binder material constituting from about 7% to 35% by weight of said mass.

ELLIS GRAY KING.